United States Patent [19]

Hawkins

[11] 3,937,092

[45] Feb. 10, 1976

[54] RECIPROCATING DEVICE HAVING VIBRATION REDUCING MEANS

[75] Inventor: Charles T. Hawkins, Verona, Pa.

[73] Assignee: PPG Industries, Inc., Pittsburgh, Pa.

[22] Filed: Nov. 1, 1973

[21] Appl. No.: 411,952

Related U.S. Application Data

[62] Division of Ser. No. 229,385, Feb. 25, 1972, Pat. No. 3,796,184.

[52] U.S. Cl. .......... 74/27; 74/99 R; 118/223

[51] Int. Cl.² .......... F16H 21/02

[58] Field of Search .......... 74/99, 27, 29, 59.15; 118/323, 324

[56] References Cited

UNITED STATES PATENTS

| | | | |
|---|---|---|---|
| 2,488,519 | 11/1949 | Andrews et al. | 118/323 |
| 2,728,238 | 12/1955 | Paasche | 118/323 |
| 2,840,037 | 6/1958 | Verba | 74/27 |
| 3,040,381 | 6/1962 | Pioch | 118/323 |
| 3,429,195 | 2/1969 | Bassoff | 74/29 |
| 3,765,251 | 10/1973 | Whitenack, Jr. | 74/29 |

*Primary Examiner*—Samuel Scott
*Assistant Examiner*—Wesley S. Ratliff, Jr.
*Attorney, Agent, or Firm*—Donald Carl Lepiane

[57] ABSTRACT

A reciprocating spray device is provided with means for reducing vibration associated with reversal of motion at the end of each path of reciprocation. The vibration reducing means includes accelerative force transfer means which are contacted by the reciprocating spray apparatus at the points of reversal of its motion for transfer of substantially all of the reciprocating spray device accelerative forces to a spray bridge which is rigidly mounted to a carriage having shock absorbing means connected thereto and movably mounted on support means so that transferred accelerative forces from the reciprocating spray apparatus cause the carriage to move substantially parallel to and in an opposite direction from the motion of the reciprocating spray apparatus, and providing for the shock absorber to contact a fixed stop mounted in fixed relation to the supporting beam.

7 Claims, 2 Drawing Figures

RECIPROCATING DEVICE HAVING VIBRATION REDUCING MEANS

BACKGROUND OF THE INVENTION

This is a division of application Ser. No. 229,385, filed Feb. 25, 1972, now U.S. Pat. No. 3,796,184.

This invention relates to reciprocating devices and, more particularly, relates to reciprocating spray devices provided with means for reducing the shock incident to the reversal of the direction of travel of the reciprocating apparatus.

In the continuous coating of substrates, it has been found convenient to use reciprocating spray guns or other coating apparatus in combination with conveyors to move the articles to be coated past the reciprocating coating devices during their reciprocation and spraying. Since the reciprocating devices may have considerable mass and may be designed to travel at high rates of speed, considerable inertia is associated with such reciprocating devices. This inertia causes considerable shock to the spray device and to the support for the spray device when the spray device direction is reversed. In the past, workers have provided shock absorbers to reduce the shock incident to reversal of the direction of travel at the end of its strokes, and to aid starting the devices on their return strokes. Shock absorbers have been mounted on fixed supports for reciprocating devices and positioned to engage the reciprocating device at the end of its stroke. Depending upon the spring constant of the shock absorbers employed, some reduction of vibration associated with reversal of direction may be provided. See U.S. Pat. No. 2,728,238, which shows a heavy spring shock absorber acting directly on a reciprocating spray device.

The devices known in the past experience vibration of both the supporting structure on which the shock absorber is mounted and also experience vibration of the reciprocating spray device associated with them. while this vibration is tolerable in some processes, it has been found to be intolerable in others. In particular, spray devices associated with the coating of hot glass as it leaves a refractory-lined forming enclosure must be substantially vibration-free. If such devices are not substantially vibration-free, impurities clinging to the refractory enclosure are dislodged and come to rest on the hot glass, causing imperfections in the glass surface. Devices of the design known in the art and disclosed in the patent above cited have excessive vibration, which prevents their utilization in such an environment.

SUMMARY OF THE INVENTION

An apparatus is provided for reducing vibration normally associated with the reversal of direction of a reciprocating mass. The reciprocating mass may comprise a dispensing device, such as those for spraying liquids or discharging powders or vapor; or it may comprise a cutting, scoring or severing device, such as for cutting a continuous sheet (e.g., glass, paper, fabric or the like); or it may comprise an inspecting device, such as a camera or an electro-optical device for detecting flaws in glass or other sheet material; or it may comprise a marking device, such as a printing roll; or it may comprise a cleaning device, such as brushes or the like. In all these specific embodiments of this invention and in others which may be contemplated using the principles of this invention it is of great importance to substantially reduce the vibration normally associated with reversal of direction of the reciprocating operating device. In particular, the reduction of vibration associated with a coating applicator serves to reduce non-uniform coating at the ends of the reciprocation strokes and substantially reduces the dropping of accumulated material from the applicator to the substrate being coated, which drops of material normally causes spot defects in coatings produced.

The apparatus of this invention incorporates a reciprocating means, such as a spray or other type of dispensing device, movably mounted on oscillating means. (The distinction herein of "reciprocating" and "oscillating" is one of form only to ease in the understanding of the present invention and to clearly characterize the device as including two movable elements.)

In the preferred device, the oscillating means comprises a spray bridge rigidly mounted to a carriage. The oscillating means is provided with means for transferring substantially all of the acceleration force associated with the reversal of the reciprocating device to the oscillating means. In the preferred embodiments of this invention, this transfer means comprises a combination of a drive chain having a pin in contact with the reciprocating device and a pair of sprocket wheels engaging the chain, each sprocket wheel having a shaft mounted on the oscillating means in a manner to transfer all components of force associated with the motion of the shaft except rotation to the oscillating means.

The oscillating means generally comprises structural members having guide rails and supports for the reciprocating device and is movably mounted on supporting means, such as a crossbeam or rail. The supporting crossbeam or rail is substantially parallel to the translational axis of the reciprocating device, and the oscillating means is mounted thereon to move in a path substantially parallel to the motion of the reciprocating device. The oscillating means is provided with shock absorbers, which act to absorb shock along an axis substantially parallel to the motion of the reciprocating device. The shock absorbing means may be mounted on opposite ends of the oscillating means, or may be mounted in fixed relation to the supporting crossbeam or rail positioned to engage the oscillating means. The preferred embodiment of this apparatus has the shock absorbers mounted on the ends of the oscillating means, with one absorber provided to have an adjustable travel distance for the shock absorbing medium or spring in the shock absorber.

Adjustable stops are provided to engage the shock absorbers mounted on the ends of the oscillating means. These stops are mounted in fixed relation to the supporting crossbeam or rail, and are preferably mounted on the supporting means itself. The stops may comprise fixed structural members, but are preferably adjustable. Adjustable stops may be provided for adjustment in increments by providing differing points of attachment for the stop to the support means. It is preferred that the stops be mounted in a fixed position and be provided with some means for adjustment which is more precise. The stops of the preferred embodiment are air cylinder operated pistons which may be positioned in fixed relation to the supporting means. The position may be varied with ease.

DESCRIPTION OF THE PREFERRED EMBODIMENTS

Figure 1:
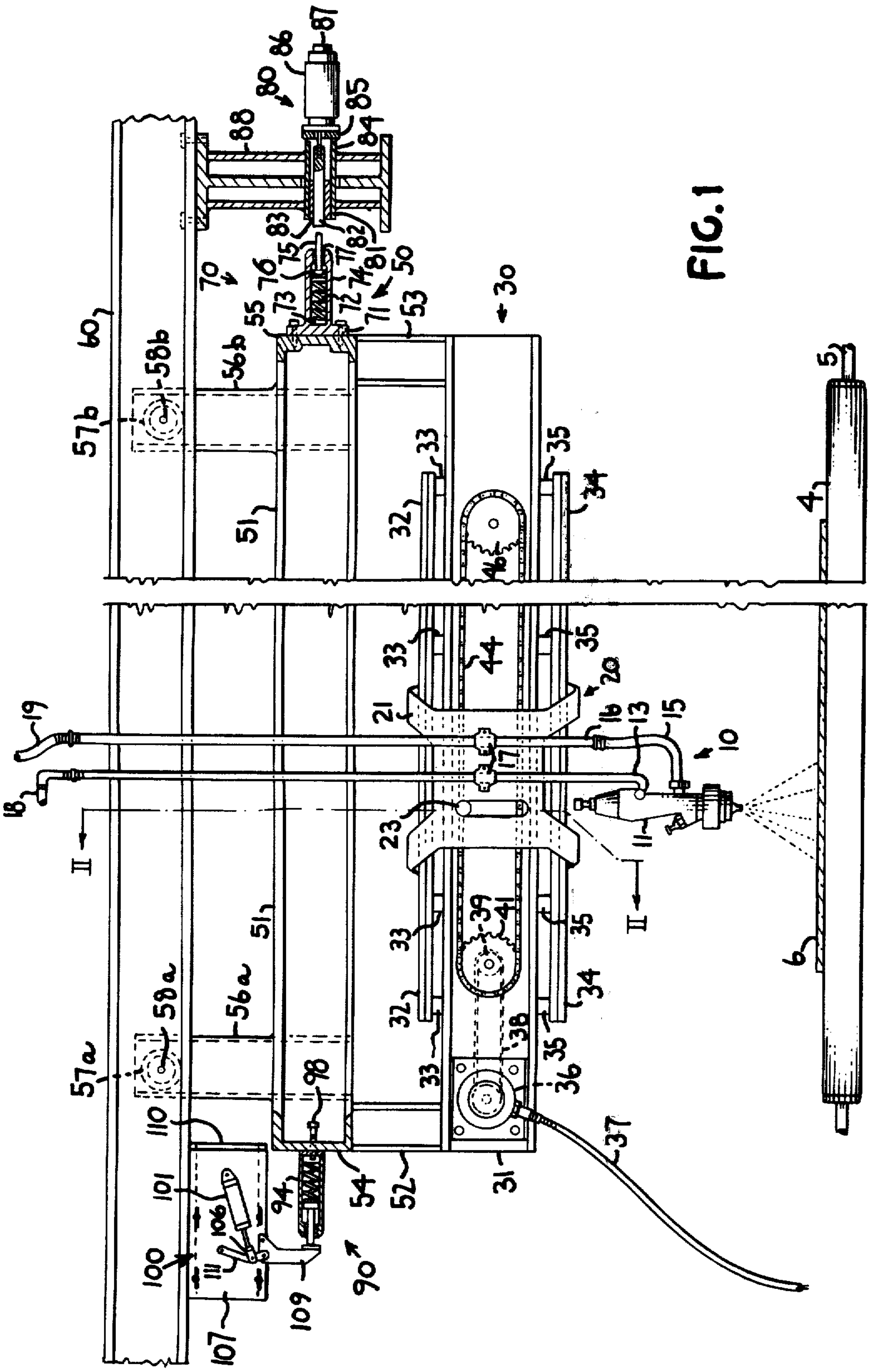
FIG. 1 is a partial sectional view showing the reciprocating spray device of this invention when viewed in a plane perpendicular to the direction of motion of a workpiece or substrate along a conveyor beneath the reciprocating device.

The present invention is best understood with reference to the drawings. A spraying apparatus is provided with conveying rolls 4 mounted on axles 5, which are rotatably mounted and provided with drive means (not shown) to convey a substrate 6 to be coated, preferably a continuous ribbon of glass, along a path beneath the spray gun of this invention so that the glass may be coated.

A reciprocating spray device is positioned above the conveyor to traverse the width of the moving substrate as it moves along the conveyor. The apparatus may be arranged to traverse the substrate along a path substantially perpendicular to the travel of the substrate, or may be arranged to traverse the substrate at some other angle with respect to its motion. The preferred arrangement is to provide for a traversing path substantially perpendicular to the direction of travel of the substrate.

If the vibration-reducing apparatus of this invention were employed to carry a cutting device, such as for cutting a continuous ribbon of paper or scoring a continuous ribbon of glass, it would be preferable to have the device arranged at some angle other than 90° with respect to the movement of the continuous ribbon, with the angle coordinated with the speed of the continuous ribbon and the speed of the reciprocating cutter to provide a desired angle of cut with respect to the edge of the substrate.

A spray apparatus 10 is provided in the preferred embodiment. It comprises a spray gun 11 connected to a first conduit 13 for supplying spray composition and connected to a second conduit 15, preferably flexible, for supplying gas or air to the spray gun. When providing a flexible conduit for air connected to the spray gun, it is connected to a rigid conduit 16 for supplying the gas or air. Both the spray composition conduit 13 and the air supply conduit 16 are mounted on a reciprocating apparatus or device for supporting the spray apparatus by means of mounting clamps 17. The spray composition conduit and the air conduit are respectively connected to first and second flexible supply conduits 18 and 19. These flexible conduits are connected to remotely located sources of coating composition and pressurized air (not shown). Flexible conduits are employed so that the spray apparatus 10 may be reciprocated while connected to sources of coating composition and air.

The spray apparatus 10, is mounted on a movable device or means 20 for supporting the spray apparatus for its reciprocating movement. The movable device comprises a reciprocating device body 21, such body having a slot substantially perpendicular to the intended given axis of reciprocation. A bearing 23 is movably mounted in the slot of the body of the movable device 20. This bearing is mounted in the slot so that it can move along the major dimension of the slot while riding against the side of the slot.

Figure 2:
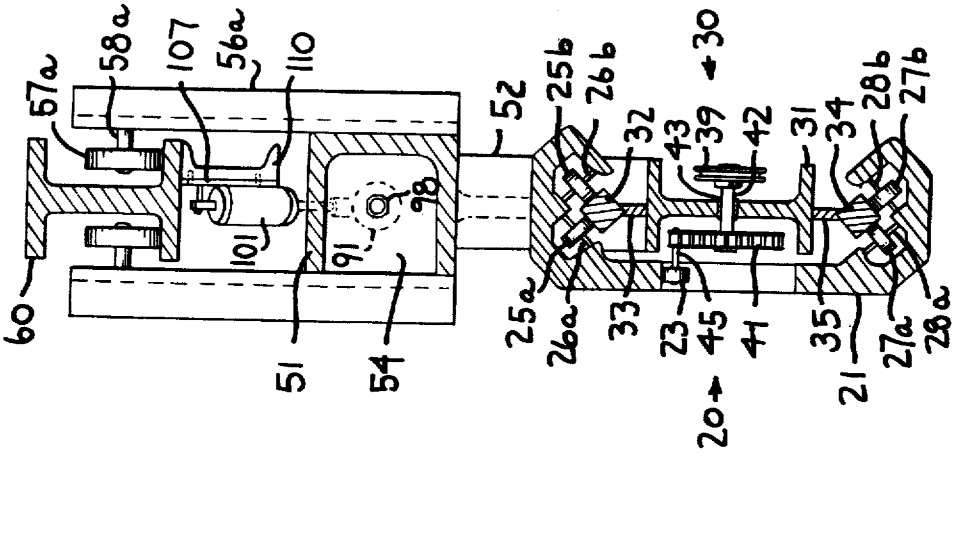
FIG. 2 is a sectional view taken along section line 11—11 of FIG. 1 showing the accelerative force transfer means which transfers substantially all of the forces associated with reversal of the reciprocating device to the oscillating means.

The movable device 20 is provided with two pairs of upper supporting rollers **25*a* and 25*b*, one pair being shown in FIG. 2, and another corresponding pair of upper supporting rollers at the opposite upper corner of the reciprocating device. The upper supporting rollers are rotatably mounted on respective axles 26*a* and 26*b* carried by the reciprocating device body 21. Two additional pairs of lower supporting rollers 27*a* and 27*b*, one pair being shown in FIG. 2, and the other pair at the opposite lower corner of the reciprocating device body are also provided. These lower supporting rollers are rotatably mounted on the reciprocating device body by respective axles 28*a* and 28*b***.

The movable device 20 is movably mounted on a spray bridge 30 extending substantially parallel to the given axis of reciprocation. The spray bridge comprises a spray bridge crossbeam 31 with upper and lower supporting guide rails 32 and 34, respectively, mounted on the crossbeam by mountings 33 for upper guide rail 32 and 35 for lower guide rail 34. The upper guide rail 32 is preferably a metal bar of rectangular, preferably square, cross section, and the mountings consist of a plurality of small metal plates welded to the crossbeam and the bottom edge of the upper supporting guide rail, with the guide rail mounted so that one diagonal of its cross section is substantially parallel to the conveyed substrate 6 and the other diagonal of its cross section is substantially perpendicular to the plane of the conveyed substrate. The lower supporting guide rail 34 is mounted on the spray bridge crossbeam 31 in similar fashion to the mounting of the upper supporting guide rail, except with a downward orientation. Guide rails 32 and 34 extend parallel to the given axis of reciprocation.

The movable device 20 is mounted on the spray bridge 30 with the two pairs of upper supporting rollers **25*a* and 25*b* engaging the upper supporting guide rail 32 and with the two pairs of lower supporting rollers 27*a* and 27*b* engaging the lower supporting guide rail 34. With the movable device 20 so mounted, it is apparent that it can move along the upper and lower supporting guide rails 32 and 34**.

A drive motor 36 is mounted on the spray bridge crossbeam 31 to serve as means to impart reciprocating motion to the movable device 20. An electric drive motor is preferably employed, and the drive motor is provided with a flexible power cable 37 connected to an electric power supply (not shown). The drive motor 36 is coupled with the movable device in order to impart reciprocating motion to the movable device. The drive motor is provided with drive coupling means 38, such as a drive belt, a gear drive, or a universal linkage. A drive transfer pulley 39 is mounted on a wheel shaft 42, which in turn is mounted on spray bridge 30 through a bearing 43 (FIG. 2). The drive coupling means 38, comprising a drive belt, connects the drive motor 36 and the drive transfer pulley 39. Mounted on the wheel shaft 42 is a drive sprocket wheel 41. Mounted on the opposite end of the spray bridge 30 from the drive sprocket wheel 41 is a driven sprocket wheel 46, provided with a wheel shaft and bearing similar to that provided for the drive sprocket wheel. A drive chain 44 is provided about the drive sprocket wheel 41 and driven sprocket wheel 46. The drive chain 44 is provided with a drive chain pin 45 (FIG. 2) for engaging the bearing 23, which is movably mounted in the slot of the reciprocating device body 21.

During operation, the drive spocket wheel 41 is rotated, causing the drive chain 44 to move about the two sprocket wheels 41 and 46. As the drive chain pin 45 is drawn from the point on one sprocket wheel most remote from the other sprocket wheel to a point on the second sprocket wheel most remote from the first, it causes the movable device 20 to move by applying a force against one side of the slot in the reciprocating device body 21. The speed of the movable device is, for constant sprocket wheel rotation speed, substantially constant, while the drive chain pin is moving between the wheels along a path substantially tangent to both. As the drive chain pin goes about each wheel, the movable device first decelerates to zero horizontal speed and then accelerates to its maximum and substantially constant horizontal speed. During this acceleration, the inertia of the movable device results in a transfer of force, characterized as accelerative force, to the chain and sprocket wheels, and hence through the wheel shafts to the spray bridge. In the absence of a shock absorber directly engaging the movable device, substantially all of the accelerative forces are transferred from the movable device to the spray bridge. Such direct-acting shock absorbers are generally undesirable in the present apparatus, it being preferred to transfer substantially all of the accelerative force associated with reversal of the movable device to the spray bridge from the movable device as it reciprocates.

The spray bridge 30 is mounted on a carriage 50 by vertical connecting beams 52 and 53. The structure comprising the spray bridge 30 and carriage 50 connected together constitutes what is characterized herein as oscillating means. This oscillating means (30,50) is supported by vertical beam trolley brackets **56*a* and 56*b*, which have trolley wheels 57*a* and 57*b* mounted on them by means of axles 58*a* and 58*b*. These trolley wheels 57*a* and 57*b* ride on a supporting crossbeam member 60 mounted, preferably horizontally, on supports (not shown). A second pair of brackets and trolley wheels are provided to engage the opposite side of the supporting crossbeam 60; see upper left of FIG. 2. The oscillating (30,50) means is free to move in an oscillatory or reciprocating path substantially parallel to the given axis of movement of the movable device 20, with its trolley wheels 57*a* and 57*b* and their corresponding opposing pair rolling back and forth along the supporting crossbeam member 60. When the movable device 20 is moving in one direction, a transfer of accelerative forces from it to the oscillating means (30,50) causes a reaction motion in the opposite direction for the oscillating means (30,50**).

Mounted on the ends of the carriage 50 are end plates 54 and 55. Mounted on these end plates are shock absorbers 70 and 90 for absorbing the shock due to reversal of the oscillating means, (30,50), which moves in reaction to the movement of the movable device 20. In the preferred embodiment, the shock absorbers 70 and 90 are mounted on the oscillating means, (30,50), and one shock absorber 90 is provided with an adjustment bolt 98 to adjust the length of travel of the absorbing spring 92, while the other shock absorber 70 is, for reasons of economy, a non-adjustable shock absorber. Looking first at the shock absorber arrangement shown on the right side of the carriage in FIG. 1, it may be seen that shock absorber 70 comprises a base plate 71 which is mounted on the end plate 55 of the carriage, and a cylinder 74 in which is positioned a spring 72 held between spring alignment plate 73 and spring alignment holding plate 76, on which is mounted an operating shaft 75 which is confined within the cylinder 74 by a seal 77.

A stop or stopping means 80 is provided to engage the shaft 75 of the shock absorber 70 mounted on the oscillating carriage 50. In the preferred embodiment, the stopping means 80 is mounted directly onto the supporting crossbeam member 60 by mounting bracket 88. The stopping means comprises a cylinder 81 mounted in the mounting bracket, having therein a piston 82 for engaging the shaft of the shock absorber. The piston of the stop is mounted within the cylinder surrounded by a seal 83, and is mounted on a pin 84 passing through a base plate 85 to an air cylinder 86 having an adjustment means 87. In the preferred embodiment, the air cylinder 86 is used to fix the piston position in a chosen position to permit travel of the oscillating means (30,50) over a prescribed path length, which is maintained during operation. As will be understood to those skilled in the art, the stop means could be a fixed structural member, and it will be understood that the device described for the preferred embodiment is selected in order to provide for ease of adjustment.

Figure 3:
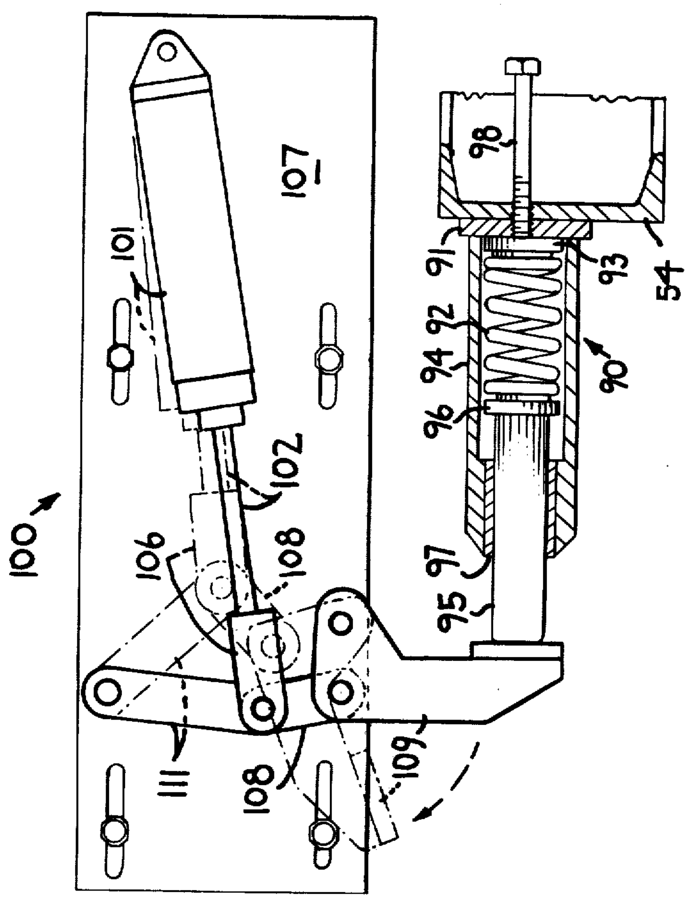
FIG. 3 is a detailed enlarged view of a removable stop showing the stop in withdrawn position to provide for the removal of the entire apparatus by conveying it along the support means.

Looking now to the left side of FIG. 1, or to FIG. 3 a second shock absorber 90 and stop 100 are illustrated. This shock absorber 90 is mounted to end plate 54 by base plate 91. This shock absorber comprises cylinder 94, in which is positioned a spring 92 on a spring alignment plate 93, and with its opposite end engaged by a spring alignment and holding plate 96, on which is mounted a shaft 95 maintained within the cylinder 94 by a seal 97. This shock absorber 90 is provided with an adjustment bolt 98, which is employed to adjust the possible length of travel of the shaft 95 and spring 92.

A stopping means 100 on the left side of the apparatus as shown in FIG. 1 is characterized by being adjustable into two positions illustrated in FIG. 3, one position being its locked-down position for use as a stop during operation, and the other position being its up position to permit the removal of the entire oscillating means (30,50) with its mounted movable device from its operating position over a conveyor. With the stop in an up position, the oscillating means (30,50) may be moved along the supporting crossbeam member 60 to the left in FIG. 1, withdrawing it from its operating position. This is of great utility particularly when the environment surrounding the device in operation is hostile, such as the exit region of a glass forming structure. Ease of removal of the entire apparatus is important to provide for maintenance and adjustment of the spray equipment outside the spray area. Stopping means 100 comprises a piston 102 mounted in an air cylinder 101. The air cylinder 101, is mounted on a supporting bracket 107 which is adjustable in relationship to a support beam 110 mounted on the crossbeam supporting member 60. Mounted on a connecting link 108 extending from piston 102 by connector 106 is a doubly-pivoted stop member 109. The pivot point of stop 109 most remote from cylinder 101 is connected to the connecting link 108, while the other pivot point is connected to supporting bracket 107. An articulating arm 111 is connected to connector 106 and connecting link 108 at a common pivot point while having its opposite end pivotably mounted to mounting bracket 107. The adjustment of the extension of the piston 102 connected to the air cylinder causes the adjustable doubly-pivoted stopping member 109 to be positioned in either its locked-down position or its up position as illustrated in FIG. 3.

During operation, a substrate 6 to be coated, such as glass, is conveyed along the conveyor and the movable device 20 is caused to reciprocate at high speed back and forth transverse to the direction of substrate movement, while a coating composition is sprayed against the substrate to be coated. As the movable device 20 accelerates in either direction, substantially all of the associated accelerative forces are transferred to the oscillating means (30,50) comprising the spray bridge 30 and carriage structure 50. These transferred accelerative and decelerative forces are then dissipated by the shock absorbing means, 70 and 90, which engage the stops 80 and 100. The motion of the oscillating means (30,50) and the compression of the shock absorbers 70 and 90 when engaging the stops 80 and 100 cooperate to dissipate the forces while moving in a small amplitude relative to the reciprocation motion of the movable device 120. It has been found that with the present device, the vibration of the movable device 20 and vibration of the supporting means structure (crossbeam 60 and associated supports) is reduced such as to have negligible effect upon either the movable device or the supports. Even when a spraying device having substantial mass is operated at extremely high speeds it is possible to operate without noticeable vibration.

The present invention is particularly useful to provide an apparatus for applying coatings to a continuous ribbon of glass as it leaves a float forming bath. Spraying apparatus constructed in accordance with this invention may be operated in close proximity to a float bath without causing excessive vibration resulting in the dislodgment of particles from the refractory structure causing impurities to fall into the soft glass during forming.

In addition to improved compatibility between the present apparatus and the processes and equipment with which it is used a particularly advantageous additional benefit is enjoyed. Substantial vibration and shock associated with high speed reciprocating devices causes a high rate of wear for both the reciprocating movable devices and the attendant supporting structure. The rate of wear and the potential for structural failure is enhanced by the jerk as well as the acceleration associated with reversal. The present invention provides for reduced effects upon structure due to reversal jerk and acceleration, and longer structural life than previously experienced is expected for devices constructed in accordance with this invention.

It will be understood by those skilled in the art that the concepts of the present invention may be employed in apparatus having structural difference from those here described in detail. For example, it will be apparent that the shock absorbing means and stopping means may be positioned to engage at locations interior as well as exterior of the range of reciprocating motion of the movable device. The oscillating means may be constructed so that a stop and shock absorber are engaged on the left of the oscillating means when it is moving to the right and vice versa in contrast to the described preferred embodiment. The combination of oscillating means, stops and shock absorbers may also be constructed either to provide free movement of the oscillating means between stops, as described above, or may be constructed so that some shock absorber engagement is always maintained. Also, it will be apparent that either compression or tension stressed shock absorbers could be employed. Variations may be made in the structure of this invention without departing from the spirit thereof, and the present invention is not to be considered as limited in scope by the present disclosure, but is rather defined by the claims which follow.

I claim:

1. An apparatus for reciprocating a movable device along a given axis of reciprocation, comprising:
- a movable device;
- means connected to said movable device for imparting accelerating and decelerating forces to said device and a reciprocating motion to said device along the given axis of reciprocation;
- carriage means;
- means for mounting said carriage means for movement along a path substantially parallel to the given axis of reciprocation;
- means operatively connected to said carriage means and to said reciprocating motion imparting means for transferring substantially all of the accelerating and decelerating forces associated with the reciprocation of said movable device to said carriage means to oscillate said carriage means along the path substantially parallel to the given axis of reciprocation of said movable device and substantially opposite to the motion of said device; and
- shock absorbing means for countering the motion of said carriage means produced by the accelerating and decelerating forces associated with the reciprocation of said movable device.

2. The apparatus as set forth in claim 1, wherein said mounting means includes:
- support means;
- wheel means for translatably mounting said carriage means on said support means;
- stop means mounted on said support means for confining movement of said carriage means along the path substantially parallel to the given axis of reciprocation; and
- said shock absorbing means disposed along the path of said carriage means between each of said stop means and said carriage means.

3. The apparatus as set forth in claim 2, wherein at least one of said stop means is adjustable to at least two positions, said adjustable stop means comprising a stop member connected to means for moving said stop member to a position such as to engage said carriage means and to a position such as to permit said carriage means to be moved past said stop means along said support means.

4. The apparatus as set forth in claim 3, wherein said adjustable stop means comprises a doubly-pivoted stop member connected to a connecting link having two connecting points at its first pivot and connected to a fixed mounting at its second pivot, said connecting link connected at its connecting point opposite to that point connecting said stop member to a first connecting point of an articulating arm having two connecting points, the second being connected to said fixed mounting, and an extendable member connected to said connecting link and said articulating arm at their common connecting point, said extendable member connected to means for extending and retracting said member whereby said stop member is caused to rotate about its point of connection to said fixed mounting.

5. The apparatus as set forth in claim 1, wherein said carriage means includes:

supporting guide rails extending parallel to the given axis of reciprocation wherein said movable device is movably mounted on said guide rails;

continuous drive means operatively connected to said transferring means for moving said movable device along said guide rails; and said movable device includes:

reciprocating body means operatively connecting said continuous drive means and said device for transferring substantially all of the accelerating forces and decelerating forces from said movable device to said drive means.

6. The apparatus as set forth in claim 1, where said shock absorbing means includes a shock absorber mounted on each end of said carriage means and the apparatus further includes:

stop means connected to said mounting means for engaging said shock absorbers at the extent of each stroke of the oscillating motion of said carriage means.

7. The apparatus as set forth in claim 1, wherein said shock absorbing means includes shock absorbers mounted on said mounting means and positioned to engage said carriage means at the extent of each stroke of the oscillatory motion of said carriage means.

* * * * *